US012566928B2

(12) United States Patent     (10) Patent No.: US 12,566,928 B2
Imani et al.     (45) Date of Patent: Mar. 3, 2026

(54) READABILITY BASED CONFIDENCE SCORE FOR LARGE LANGUAGE MODELS

(71) Applicant: Microsoft Technology Licensing, LLC, Redmond, WA (US)

(72) Inventors: Shima Imani, Sammamish, WA (US); Harsh Shrivastava, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 18/140,389

(22) Filed: Apr. 27, 2023

(65) Prior Publication Data

US 2024/0362417 A1     Oct. 31, 2024

(51) Int. Cl.
*G06F 40/40*     (2020.01)
*G06F 40/205*     (2020.01)

(52) U.S. Cl.
CPC ............ *G06F 40/40* (2020.01); *G06F 40/205* (2020.01)

(58) Field of Classification Search
CPC ............................... G06F 40/40; G06F 40/205
See application file for complete search history.

(56) References Cited

U.S. PATENT DOCUMENTS 9,875,300 B2 * 1/2018 Byron ................... G06F 40/205
11,847,424 B1 * 12/2023 Harkous ................ G06N 20/00

| | | | | |
|---|---|---|---|---|
| 12,148,417 B1 * | 11/2024 | Cardella | ................. | G10L 15/18 |
| 2018/0060734 A1 * | 3/2018 | Beller | ..................... | G06N 20/00 |
| 2020/0057850 A1 * | 2/2020 | Kraus | ...................... | G06N 3/09 |
| 2023/0050034 A1 * | 2/2023 | Ben-Elazar | .......... | G06Q 50/205 |
| 2024/0304184 A1 * | 9/2024 | Pieraccini | ............ | G10L 15/197 |
| 2025/0068743 A1 * | 2/2025 | Rahman | .............. | G06F 11/3688 |

FOREIGN PATENT DOCUMENTS

CN     111104789 A * 5/2020 ......... G06F 16/3344

OTHER PUBLICATIONS

Garbacea, et al., "Judge the Judges: A Large-Scale Evaluation Study of Neural Language Models for Online Review Generation", arXiv preprint arXiv:1901.00398, Sep. 5, 2019, 33 pages.
International Search Report and Written Opinion received for PCT Application No. PCT/US2024/023518, Aug. 8, 2024, 12 pages.
Tang, et al., "The Science of Detecting LLM-Generated Text", Communications of the ACM, vol. 67, Issue 4, Mar. 7, 2024, pp. 50-59.

* cited by examiner

*Primary Examiner* — Bhavesh M Mehta
*Assistant Examiner* — Eunice Lee
(74) *Attorney, Agent, or Firm* — Ray Quinney & Nebeker P.C.; Tiffany B. Healy

(57) ABSTRACT

The present disclosure relates to methods and systems that generate a confidence score for the generated large language model (LLM) output. The methods and systems use the text of the input provided to the LLM and the text from the generated LLM output to produce a feature vector that encodes a readability of the text from the input and the text of the LLM output. The feature vector is used to determine a corresponding confidence score for the generated LLM output. The confidence score is used to evaluate a quality of the generated LLM output.

20 Claims, 6 Drawing Sheets

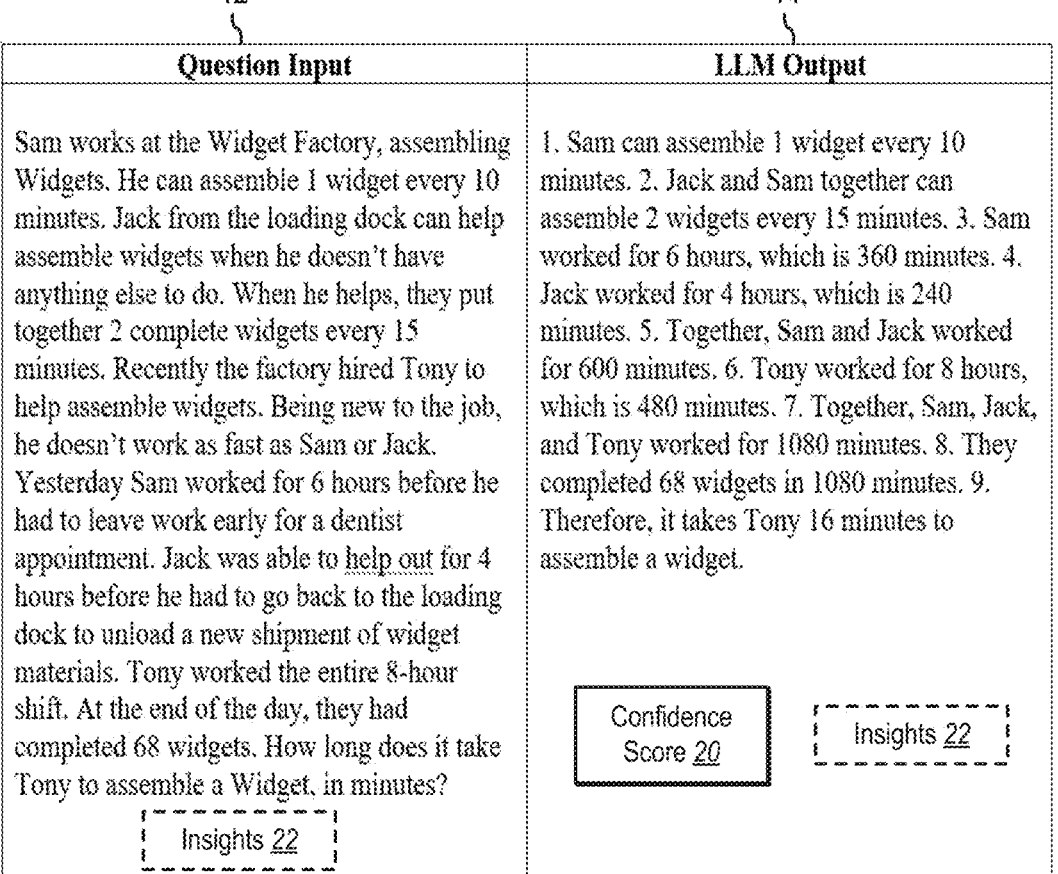

| 12 | 14 |
|---|---|
| Question Input | LLM Output |
| Sam works at the Widget Factory, assembling Widgets. He can assemble 1 widget every 10 minutes. Jack from the loading dock can help assemble widgets when he doesn't have anything else to do. When he helps, they put together 2 complete widgets every 15 minutes. Recently the factory hired Tony to help assemble widgets. Being new to the job, he doesn't work as fast as Sam or Jack. Yesterday Sam worked for 6 hours before he had to leave work early for a dentist appointment. Jack was able to help out for 4 hours before he had to go back to the loading dock to unload a new shipment of widget materials. Tony worked the entire 8-hour shift. At the end of the day, they had completed 68 widgets. How long does it take Tony to assemble a Widget, in minutes? | 1. Sam can assemble 1 widget every 10 minutes. 2. Jack and Sam together can assemble 2 widgets every 15 minutes. 3. Sam worked for 6 hours, which is 360 minutes. 4. Jack worked for 4 hours, which is 240 minutes. 5. Together, Sam and Jack worked for 600 minutes. 6. Tony worked for 8 hours, which is 480 minutes. 7. Together, Sam, Jack, and Tony worked for 1080 minutes. 8. They completed 68 widgets in 1080 minutes. 9. Therefore, it takes Tony 16 minutes to assemble a widget. |

Confidence Score 20

Insights 22

Insights 22

FIG. 2C

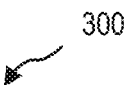
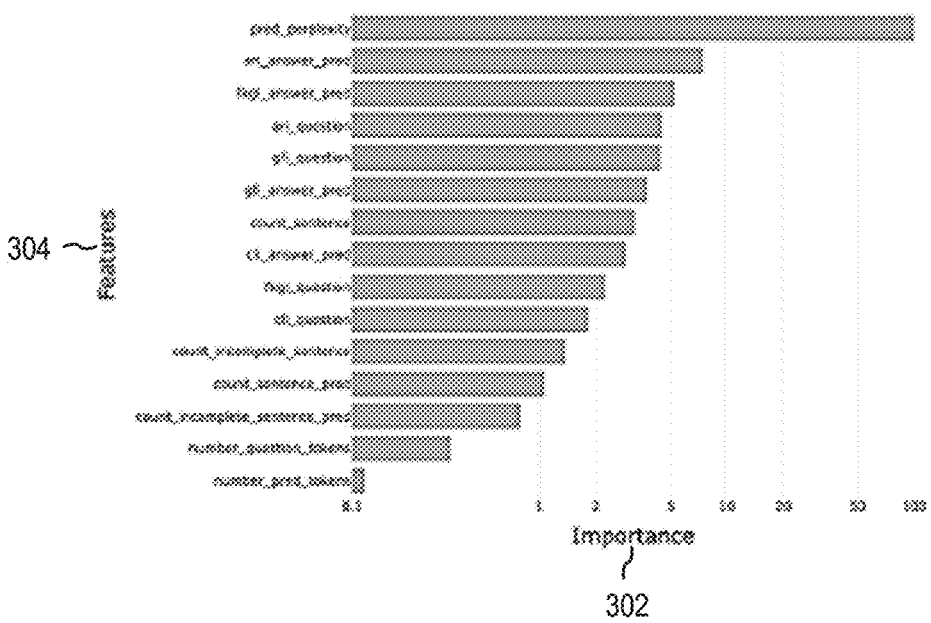
FIG. 3

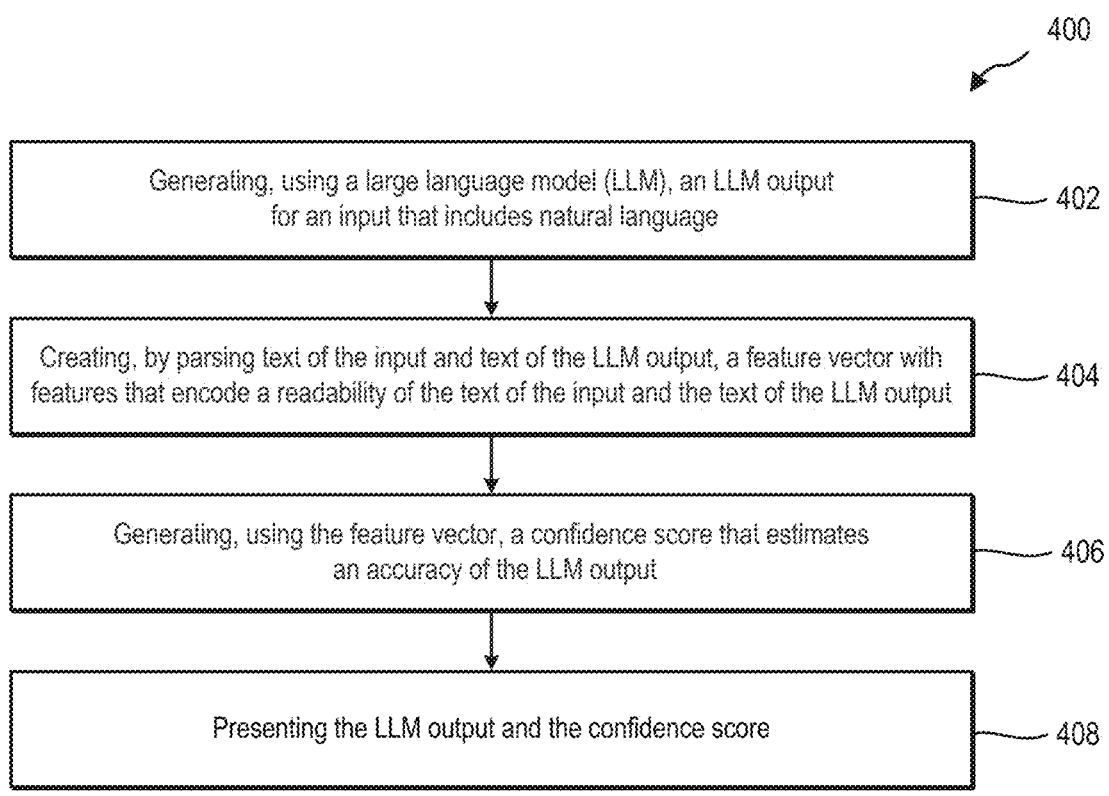

400

Generating, using a large language model (LLM), an LLM output
for an input that includes natural language
— 402

Creating, by parsing text of the input and text of the LLM output, a feature vector with
features that encode a readability of the text of the input and the text of the LLM output
— 404

Generating, using the feature vector, a confidence score that estimates
an accuracy of the LLM output
— 406

Presenting the LLM output and the confidence score
— 408

FIG. 4

READABILITY BASED CONFIDENCE SCORE FOR LARGE LANGUAGE MODELS

BACKGROUND

Large language models (LLMs) have become increasingly popular due to their ability to generate fluent and coherent text in response to various input prompts. Unfortunately, in quite a few cases, the results produced by LLMs are not always reliable, and it can be difficult to determine if the output produced by LLMs is accurate or simply a hallucination. This severely affects the reliability and trustworthiness of the LLMs.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes generating, using a large language model (LLM), an LLM output for an input that includes natural language. The method includes creating, by parsing text of the input and text of the LLM output, a feature vector with features that encode a readability of the text of the input and the text of the LLM output. The method includes generating, using the feature vector, a confidence score that estimates an accuracy of the LLM output.

Some implementations relate to a system. The system includes a processor; memory in electronic communication with the processor; and instructions stored in the memory, the instructions being executable by the processor to: generate, using a large language model (LLM), an LLM output for an input that includes natural language; create, by parsing text of the input and text of the LLM output, a feature vector with features that encode a readability of the text of the input and the text of the LLM output; generate, using the feature vector, a confidence score that estimates an accuracy of the LLM output; and present the LLM output and the confidence score.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIGS. 2A-2C illustrate example inputs and the generated LLM outputs in response to the inputs in accordance with implementations of the present disclosure.

FIG. 3 illustrates an example graph illustrating feature importance in accordance with implementations of the present disclosure.

FIG. 4 illustrates an example method for providing a confidence score for generated LLM output in accordance with implementations of the present disclosure.

DETAILED DESCRIPTION

Figure 1:
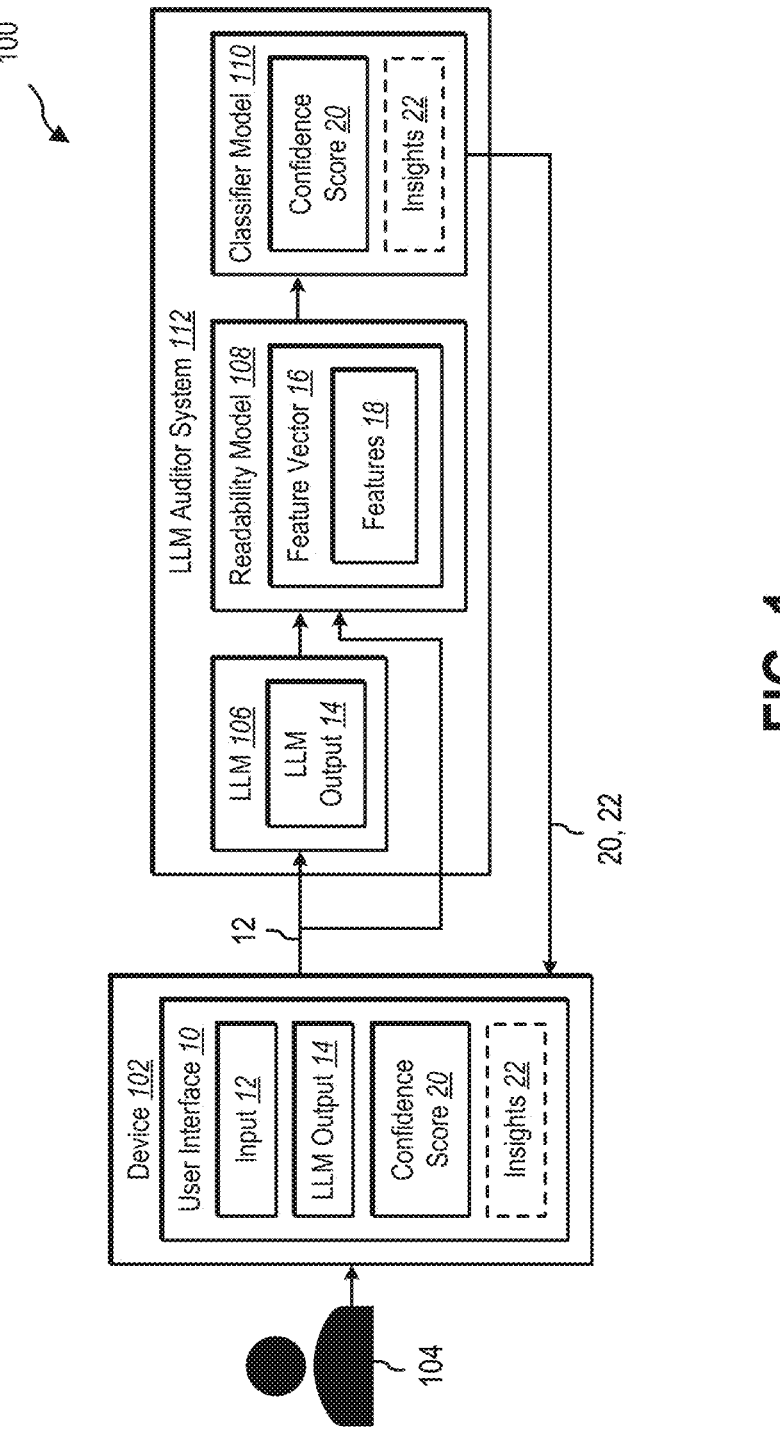
FIG. 1 illustrates an example environment with an LLM auditor system in accordance with implementations of the present disclosure.

Large language models (LLMs) have recently grown in popularity. LLMs refers to machine learning artificial intelligence (AI) models that can generate natural language text based on the patterns they learn from processing vast amounts of data. LLMs use deep neural networks, such as transformers, to learn from billions or trillions of words, and to produce text on any topic or domain. LLMs can also perform various natural language tasks, such as classification, summarization, translation, generation, and dialogue.

LLMs have demonstrated a remarkable ability in generating fluent and coherent text in response to various input prompts (e.g., questions or dialog). However, in some instances, the generated output is not factually correct or in order words, the output hallucinates. A hallucination is the generation of a false or incorrect output of the LLM. For example, an incorrect answer or nonsensical text. This severely affects the reliability and trustworthiness of the LLMs.

The methods and systems of the present disclosure generate a confidence score for the generated LLM output. The methods and systems use both the text of the input provided to the LLM and the text in the generated LLM output to produce a corresponding confidence score for the generated LLM output. The confidence score may help users assess the reliability of the generated LLM output. The methods and systems of the present disclosure use the confidence score to detect hallucinations in LLM generated text.

In some implementations, the methods and systems of the present disclosure use readability metrics that measure and quantify characteristics of textual data. The methods and systems use the readability metrics to generate features that quantify the readability of the input and the LLM output. The methods and systems calculate these features for a training data and train a classifier to predict an associated confidence score of the LLM output. The confidence score can be used as feedback to improve the output quality of the LLM. The methods and systems use the text of the input provided to the LLM as well as the text of the generated LLM output as a source of information to determine the confidence score of the generated LLM output (answers generated by the LLM). The confidence score may be used to identify the quality of the generated LLM output.

The methods and systems provide insights into the inner workings of the LLM and identify any areas where the LLM may be hallucinating or generating incorrect answers. The methods and systems analyze the readability metrics of the text of the input and the text of the generated LLM output in conjunction with the confidence score to gain insights to explain why an LLM may be hallucinating. For example, the methods and systems indicate whether the input is poorly written, too wordy, or lacks coherence and identifies which factors may be contributing to the LLM's hallucination. The information provided in the insights can help improve the quality and interpretability of the generated text by the LLM and enables users to understand the underlying factors that contribute to the output's quality. Moreover, providing a quantitative measure of the LLM's confidence, is useful in evaluating the overall performance of the LLM and helping the user structure input queries such that the LLMs can assist them with the problem.

One technical advantage of the methods and systems of the present disclosure is associating a confidence score to the generated LLM output (e.g., the predictions generated by the LLM). The confidence score may aid users in making informed decisions about the quality of the generated LLM output and may help users use LLMs more efficiently. Another technical advantage of the methods and systems of the present disclosure is providing insights into the inner workings of an LLM and identifying any areas where the LLM may be hallucinating or generating incorrect text in the LLM output. The insights provide an explanation or reason behind the confidence score. Providing the confidence score and the insights to the user, can help the users better understand the limitations of the LLM and help the users evaluate the overall performance of the LLM.

Referring now to FIG. 1, illustrated is an example environment 100 with an LLM auditor system 112. The LLM auditor system 112 automatically provides a confidence score 20 for the generated LLM output 14. The LLM auditor system 112 includes an LLM 106 that provides LLM outputs 14 in response to received inputs 12.

The LLM 106 receives the input 12 and uses deep neural networks to produce natural language text from large domain and the task. One example input 12 is a question. Another example input 12 is a sentence. Another example input 12 is a portion of a conversation or dialog. The LLM 106 generates the LLM output 14 with the natural language text in response to the input 12. Examples of the LLM 106 include GPT-3, BERT, XLNET, and ELEUTHERAI.

A readability model 108 parses the text of the input 12 and the text of the generated LLM output 14 and evaluates readability metrics of the text included in the input 12 and the text included in the LLM output 14. The readability model 108 creates a feature vector 16 based on the evaluation of the readability metrics. The feature vector 16 includes a plurality of features 18 that quantify the complexity of text included in the input 12 prompt to the LLM 106 and the LLMs output 14. The features 18 include different values that quantify the complexity of the text in the input 12 and the text of the LLM output 14. In some implementations, a high value for the feature 18 indicates that the text is complex and more difficult to read, and a low value for the feature 18 indicates that the text is easier to read. In some implementations, a low value for the feature 18 indicates that the text is complex and more difficult to read, and a high value for the feature 18 indicates that the text is easier to read.

In some implementations, the features 18 include readability metrics that evaluate human readability features of the text included in the input 12 and the text of the LLM output 14. Example human readability metrics include the Gunning Fog Index, the Coleman-Liau Index, and the Automated Readability Index. Example human readability features include sentence length, word length, and syllable count. Table 1 illustrates example human readability features and the corresponding mathematical definitions for the human readability features. Table 1 also includes descriptions of the different human readability feature.

TABLE 1

| Metrics | Mathematical Definition | Description |
|---|---|---|
| Automated Readability Index (ARI) | $4.71 \times \dfrac{letters}{words} + 0.50 \times \dfrac{words}{sentences} - 21.43$ | Assesses the U.S. grade level required to read a piece of text. |
| Coleman-Liau Index (CLI) | $\left(5.88 \times \dfrac{characters}{words}\right) - \left(29.5 \times \dfrac{sentences}{words}\right) - 15.8$ | Uses characters instead of syllables and words to calculate the reading level of a text. |
| Flesch Score | $206.835 - 1.015\left(\dfrac{total\ words}{total\ sentences}\right) - 84.6\left(\dfrac{total\ syllables}{total\ words}\right)$ | Measures the average number of syllables per word and the number of words per sentence. |
| Gunning Fog Grade | $0.4 \times \left(\dfrac{words}{sentences} + \left(100 \times \dfrac{hard\ words}{words}\right)\right)$ | Assess the education level needed to understand a text based on sentence length and word complexity. | amounts of data to include in the LLM output 14 generated in response to the input 12. In some implementations, a user 104 accesses a user interface 10 on a device 102 to provide the input 12 to the LLM 106. In some implementations, a program or application provides the input 12 to the LLM 106. The input 12 can be any prompt that includes natural language text. Input prompts are the inputs or queries that a user or a program gives to the LLM 106, in order to elicit a specific response from the LLM 106. Prompts can be natural language sentences or questions, or code snippets or commands, or any combination of text or code, depending on the The human readability features are used by the readability model 108 to provide a value that quantifies how humans comprehend the text in the input 12 and the LLM output 14.

In some implementations, the features 18 include readability metrics that include language model evaluation features to evaluate the performance of the LLM 106. The language model evaluation features evaluate the LLM output 14 to measure the LLM's 106 ability to predict and generate text. Examples of the language model evaluation features include perplexity of the text included in the LLM output 14, log-likelihood of the text in the LLM output 14, which gives an indication of the quality of the LLM's 106 performance.

The feature vector 16 uses the features 18 to encode the readability of the text of the input 12 and the text of the LLM output 14. In some implementations, the features 18 include the human readability features. In some implementations, the features 18 include the language model evaluation features. In some implementations, the features 18 include a combination of the human readability features and the language model evaluation features.

In some implementations, the features 18 included in the feature vector 16 are customizable. One example includes adding different features 18 to the feature vector 16 based on the dataset used by the LLM 106 to generate the LLM output 14. Another example includes removing features 18 from the feature vector 16 based on the dataset used by the LLM 106 to generate the LLM output 14. For example, a first set of features 18 are included in the feature vector 16 for a medical dataset used by the LLM 106 to generate the LLM output 14 and a second set of features 18, different from the first set of features, are included in the feature vector 16 for a mathematical dataset used by the LLM 106 to generate the LLM output 14. Standard features 18 may be included in the feature vector 16 regardless of the dataset used by the LLM 106 to generate the LLM output 14 and any customizations made to the features 18. For example, the standard features 18 include a portion of the human readability features and a portion of the language model evaluation features.

The feature vector 16 is provided as input to a classifier model 110. The classifier model 110 uses the feature vector 16 to predict whether the LLM output 14 is reliable and generates a confidence score 20 based on the prediction. In some implementations, the classifier model 110 learns a distribution over the readability features (e.g., the features 18). The classifier model 110 uses the distribution over the features 18 in determining the confidence score 20. The confidence score 20 indicates a level of confidence in an accuracy of the LLM output 14. In some implementations, the confidence score 20 is a value between 0 and 1, where 0 is an incorrect answer (hallucination) and 1 is a correct answer. A confidence score 20 with a value closer to 1 (e.g., 0.9) indicates that the LLM output 14 is more likely to be a correct answer to the input 12 and a confidence score 20 with a value closer to 0 (e.g., 0.3) indicates that the LLM output 14 is more likely to be an incorrect answer to the input 12.

In some implementations, the classifier model 110 is trained to identify feature importance of the features 18 included in the feature vector 16. The classifier model 110 is trained to identify which features 18 of the feature vector 16 impacted the confidence score 20. For example, the classifier model 110 identifies a feature 18 that identifies an automated readability index (ARI) of text of the input 12 and the generated LLM output 14 as having a higher impact on the confidence score 20 as compared to a feature 18 that identifies whether the text is a complete sentence. One example of the classifier model 110 is an Explainable Boosting Machine (EBM) model that provides interpretability in terms of individual features.

In some implementations, the classifier model 110 is used to provide insights 22 to explain which features contributed to the confidence score 20. For example, the insights 22 provide information on whether the input 12 is poorly written, the input 12 is too wordy, or the input 12 lacks coherence. The insights 22 also identify which features 18 may be contributing to the LLM's 106 hallucination (e.g., incorrect answer or information in the LLM output 14). The information provided in the insights 22 can help improve the quality and interpretability of the generated text by LLM 106 in the LLM output 14 and enable users 104 to understand the underlying factors that contribute to the output's quality. The insights 22 may also be used to update the input 12 to the LLM 106 to improve a performance of the LLM's output 14.

In some implementations, the classifier model 110 is trained using input sentences from a known dataset with an indication of the correct answers (ground truth) and the labels are used to train the classifier model 110. The readability model 108 is run on each input sentence used in the training to obtain the feature vector 16 that quantifies a complexity of the text of the input 12 (the input sentences) provided to the LLM 106 and the text of the LLM output 14 for the input sentences. The feature vector 16 is provided as input to the classifier model 110. Based on the LLM output 14 and the desired output (the ground truth information provided with the training data), the classifier model 110 is trained to prepare the corresponding prediction labels. A label of 1 suggests that the LLM output 14 generated the desired output (the LLM output 14 matches the ground truth information), while a label of 0 indicates that LLM output 14 failed to match the ground truth information.

In some implementations, the classifier model 110 is trained to identify feature importance of the features 18 included in the feature vector 16. For example, the classifier model 110 is trained to identify which features 18 extracted from the input sentences and the generated LLM output 14 impacted the values of the labels (e.g., the 1 or zero). Any classifier may be used as the classifier model 110 to predict the confidence score label from the feature vector 16.

In some implementations, the LLM output 14 and the confidence score 20 are presented in response to the input 12 on a display of the device 102 using the user interface 10. In addition, any insights 22 generated by the classifier model 110 with an explanation for which features 18 contributed to the confidences score 20 may be provided by the LLM auditor system 112 to be presented on the user interface 10 in response to the input 12. Providing a quantitative measure (the confidence score 20) of the LLM output 14 is useful in evaluating the overall performance of the LLM 106 and helping the user 104 structure input queries such that the LLM 106 can assist the user 104 with the problem. The confidence score 20 and/or the insights 22 may be used by the user 104 to understand a quality of the LLM output 14 and improve the reliability of the generated LLM output 14. The confidence score 20 and/or the insights 22 may also be used to identify areas where the LLM 106 needs improvement and may be used to provide feedback to developers of the LLM 106 to improve the LLM 106.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the user interface 10 and the LLM auditor system 112 (the LLM 106, the readability model 108, and the classifier model 110) are implemented wholly on the same computing device. Another example includes one or more subcomponents of the user interface 10 and/or the LLM auditor system 112 (the LLM 106, the readability model 108, and the classifier model 110) are implemented across multiple computing devices. Moreover, in some implementations, one or more subcomponent of the user interface 10 and/or the LLM auditor system 112 (the LLM 106, the readability model 108, and the classifier model 110) may be implemented and processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2A:
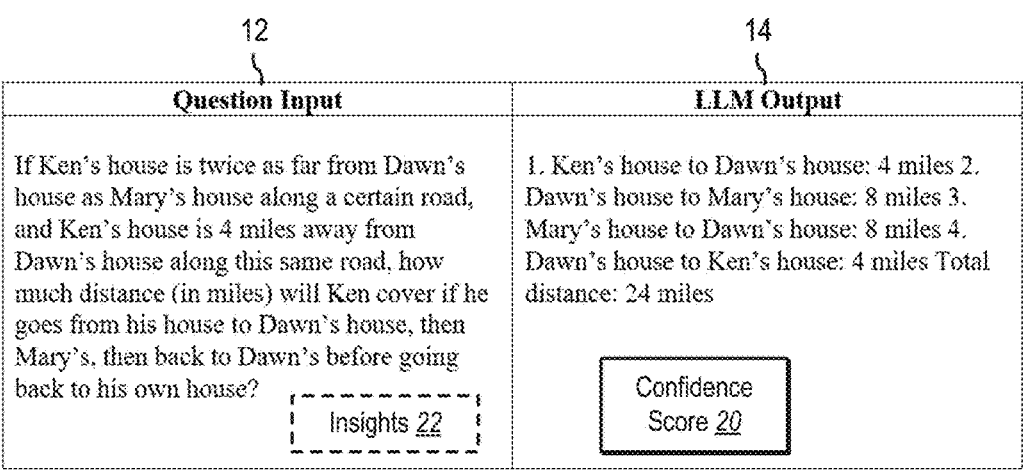

Referring now to FIG. 2A, illustrated is an example input 12 and the generated LLM output 14 for the input 12 presented, for example, on the user interface 10 (FIG. 1) of the device 102 (FIG. 1). In some implementations, the LLM auditor system 112 (FIG. 1) generates a confidence score 20 (FIG. 1) that is presented with the LLM output 14. For example, the confidence score 20 is a value in a range between 0 and 1 presented nearby the generated LLM output 14. In some implementations, the LLM auditor system 112 generates insights 22 (FIG. 1) to provide with the generated LLM output 14 for the question provided as the input 12. For example, the insights 22 provide an explanation or reason behind the confidence score 20. In some implementations, the insights 22 are presented nearby the input 12 and identify the features 18 in the input 12 that impacted the confidence score 20. For example, the insights 22 indicate that the input 12 has a high ARI value. The insights 22 help the user 104 (FIG. 1) understand a quality of the generated LLM output 14 (the LLM prediction may be incorrect or the LLM prediction may be correct) and why the LLM prediction may be an incorrect or correct response to the input 12. The user 104 may use the insights 22 to reformat the question provided as the input 12.

Figure 2B:
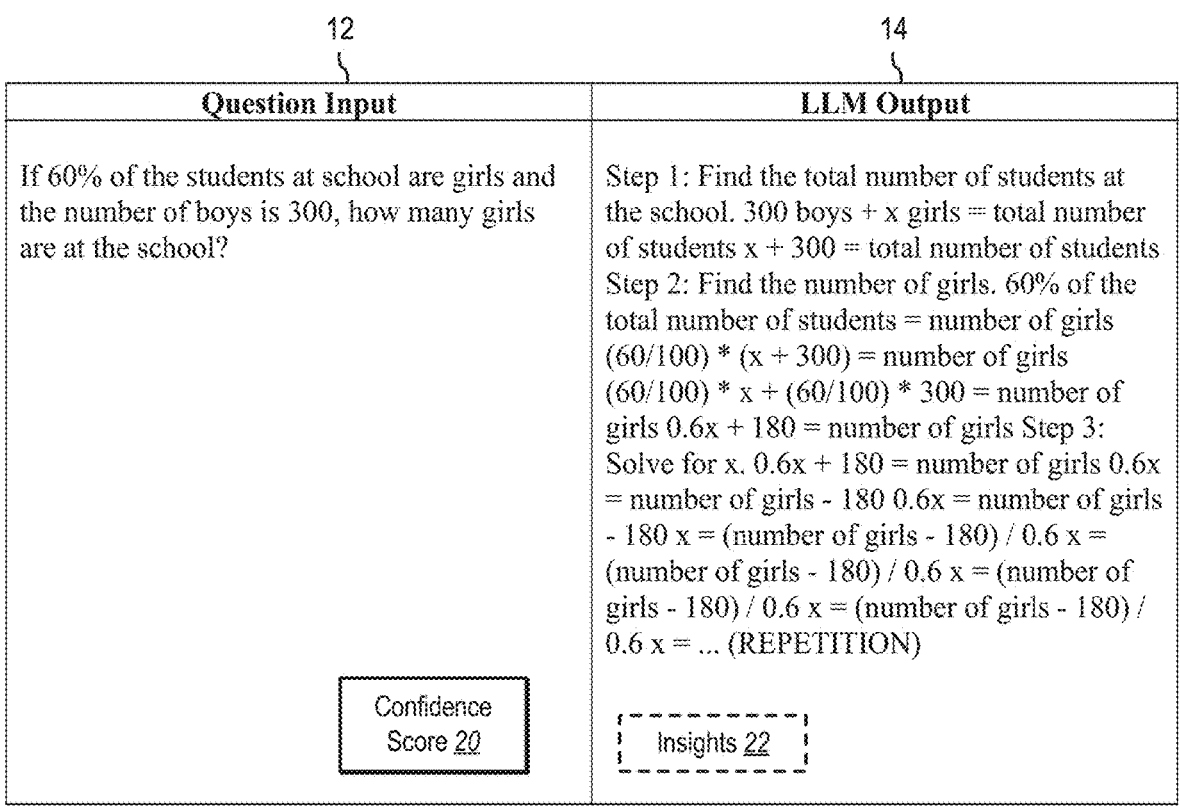

FIG. 2B illustrates an example input 12 and the generated LLM output 14 for the input 12 presented, for example, on the user interface 10 (FIG. 1) of the device 102 (FIG. 1). In some implementations, the LLM auditor system 112 (FIG. 1) generates a confidence score 20 (FIG. 1) that is presented with the LLM output 14. For example, the confidence score 20 is a value in a range between 0 and 1 presented nearby the input 12. In some implementations, the confidence score 20 is presented nearby both the input 12 and the LLM output 14. In some implementations, the LLM auditor system 112 generates insights 22 (FIG. 1) to provide with the generated LLM output 14. In some implementations, the insights 22 are presented nearby the generated output 14 and provide an explanation with identified features 18 that may be contributing to the LLM's 106 hallucination (e.g., incorrect answer or information in the LLM output 14). The user 104 may use the insights 22 to understand a quality of the generated LLM output 14 (the LLM prediction may be incorrect or the LLM prediction may be correct) and why the LLM prediction may be an incorrect or correct response to the input 12. The insight 22 may identify areas where the LLM 106 may need improvement and may be used as feedback to developers of the LLM 106 to improve the LLM 106.

FIG. 2C illustrates an example input 12 and the generated LLM output 14 for the input 12 presented, for example, on the user interface 10 (FIG. 1) of the device 102 (FIG. 1). In some implementations, the LLM auditor system 112 (FIG. 1) generates a confidence score 20 (FIG. 1) that is presented with the LLM output 14. For example, the confidence score 20 is a value in a range between 0 and 1 presented nearby the generated LLM output 14. In some implementations, the LLM auditor system 112 generates insights 22 (FIG. 1) to provide with the generated LLM output 14. In some implementations, the insights 22 are presented nearby the input 12 and identify the features 18 in the input 12 that impacted the confidence score 20. In some implementations, the insights 22 are also presented nearby the generated LLM output 14 and identify the features 18 in the generated LLM output 14 that may have impacted the confidence score 20. The insights 22 help the user 104 (FIG. 1) understand a quality of the generated LLM output 14 (the LLM prediction may be incorrect or the LLM prediction may be correct) and why the LLM prediction may be an incorrect or correct response to the input 12. The user 104 may use the insight 22 to reformat the question provided as the input 12.

Referring now to FIG. 3, illustrated is an example graph 300 that illustrates an importance of the different features. The graph 300 includes an a-axis 302 with a level of importance for the features (e.g., the features 18 included in the feature vector 16, FIG. 1) on the y-axis 304. The classifier model 110 is trained to identify feature importance and a level of importance of each feature 18 included in the feature vector 16. In some implementations, the classifier model 110 determines the level of importance for the features based on identifying which feature(s) contributed to the confidence score 20 (e.g., impacted a high confidence score or impacted a low confidence score). In some implementations, the classifier model 110 outputs the identified feature(s) in the insights 22 with the confidence score 20.

Referring now to FIG. 4, illustrated is an example method 400 for providing a confidence score for generated LLM output by an LLM in response to an input. The actions of the method 400 are discussed below with reference to FIG. 1.

At 402, the method 400 includes generating, using a large language model (LLM), an LLM output for an input that includes natural language. The input 12 is any prompt or query that includes natural language text that a user 104 or a program gives to the LLM 106, in order to elicit a specific response from the LLM 106. One example input 12 is a question. Another example input 12 is a sentence. Another example input 12 is a portion of a conversation or dialog. The LLM 106 generates the LLM output 14 with the natural language text in response to the input 12.

At 404, the method 400 includes creating, by parsing text of the input and text of the LLM output, a feature vector with features that encode a readability of the text of the input and the text of the LLM output. A readability model 108 parses the text of the input 12 and the text of the generated LLM output 14 and evaluates readability metrics of text of the input 12 and the text of the LLM output 14. The readability model 108 creates a feature vector 16 based on the evaluation of the readability metrics. The feature vector 16 includes a plurality of features 18 that quantify the complexity of text included in the input 12 prompt to the LLM 106 and the text of the LLM output 14.

In some implementations, the features 18 include human readability features that provide metrics to calculate a human readability of the text of the input 12 or the text of the LLM output 14. Example human readability features include sentence length, word length, and/or syllable count. The human readability features are used by the readability model 108 to quantify how humans comprehend the text in the input 12 and the text in the LLM output 14.

In some implementations, the features 18 include language model evaluation features that evaluate a performance of the LLM. Example language model evaluation features include perplexity of text of the LLM output or log-likelihood of text of the LLM output. In some implementations, the features 18 include both the human readability features and the language model evaluation features.

In some implementations, standard features are included in the feature vector 16. In some implementations, the features 18 included in the feature vector 16 are customizable based on the dataset being used by the LLM 106 (e.g., features 18 are added to the feature vector 16 and/or features 18 are removed from the feature vector 16). Any type of features 18 that quantify the complexity of the text included in the input 12 and the text of the LLM output 14 may be used in the feature vector 16.

At 406, the method 400 includes generating, using the feature vector, a confidence score that estimates an accuracy of the LLM output. A classifier model 110 uses the feature vector 16 to generate the confidence score 20 that estimates an accuracy of the LLM output 14. The classifier model 110 uses the features 18 to predict whether the LLM output 14 is reliable based on the readability of the text of the input 12 and the text of the LLM output 14 and generates a confidence score 20 based on the prediction. In some implementations, the classifier model 110 learns a distribution over the readability features (e.g., the features 18). The classifier model 110 uses the distribution over the features 18 in determining the confidence score 20.

The confidence score 20 indicates a level of confidence in an accuracy of the LLM output 14. In some implementations, the confidence score 20 is a value in a range between 0 and 1, where 0 is an incorrect answer (hallucination) and 1 is a correct answer. A confidence score 20 with a value closer to 1 (e.g., 0.94) indicates that the LLM output 14 is more likely to be a correct answer to the input 12 and a confidence score 20 with a value closer to 0 (e.g., 0.45) indicates that the LLM output 14 is more likely to be an incorrect answer to the input 12.

In some implementations, the confidence score 20 is based on the features 18 that measure a complexity level of the of the text of the input 12 or the text of the LLM output 14.

In some implementations, the classifier model 110 is trained by using a set of features (e.g., the features 18) extracted from input sentences from a dataset, the LLM output 14 for the input sentences, and ground truth information (e.g., answers for the questions) for the input sentences to train the classifier model 110. The classifier model 110 is trained to compare the LLM output 14 to the ground truth information and set the confidence score 20 to a value in a range between 0 and 1 in response to comparing the LLM output 14 to the ground truth information. The classifier model 110 is trained using the set of features (e.g., the features 18) extracted from the input sentences to identify which features impacted the confidence score 20.

At 408, the method 400 includes presenting the LLM output and the confidence score. The LLM output 14 and the confidence score 20 are presented, for example, on the user interface 10 of the device 102. In some implementations, the LLM auditor system 112 outputs insights 22 for the confidence score 20. The insights 22 provide an explanation or reason behind the confidence score 20. In some implementations, the insights 22 identify the features 18 in the feature vector 16 that impacted the confidence score 20, and the explanation includes the features 18.

The method 400 automatically generates the confidence score 20 for the generated LLM output 14. The confidence score 20 and/or the insights 22 may be used by the user 104 to understand a quality of the LLM output 14 and improve the reliability of the generated LLM output 14. The confidence score 20 and/or the insights 22 may also be used to identify areas where the LLM 106 needs improvement and may be used to provide feedback to developers of the LLM 106 to improve the LLM 106.

Figure 5:
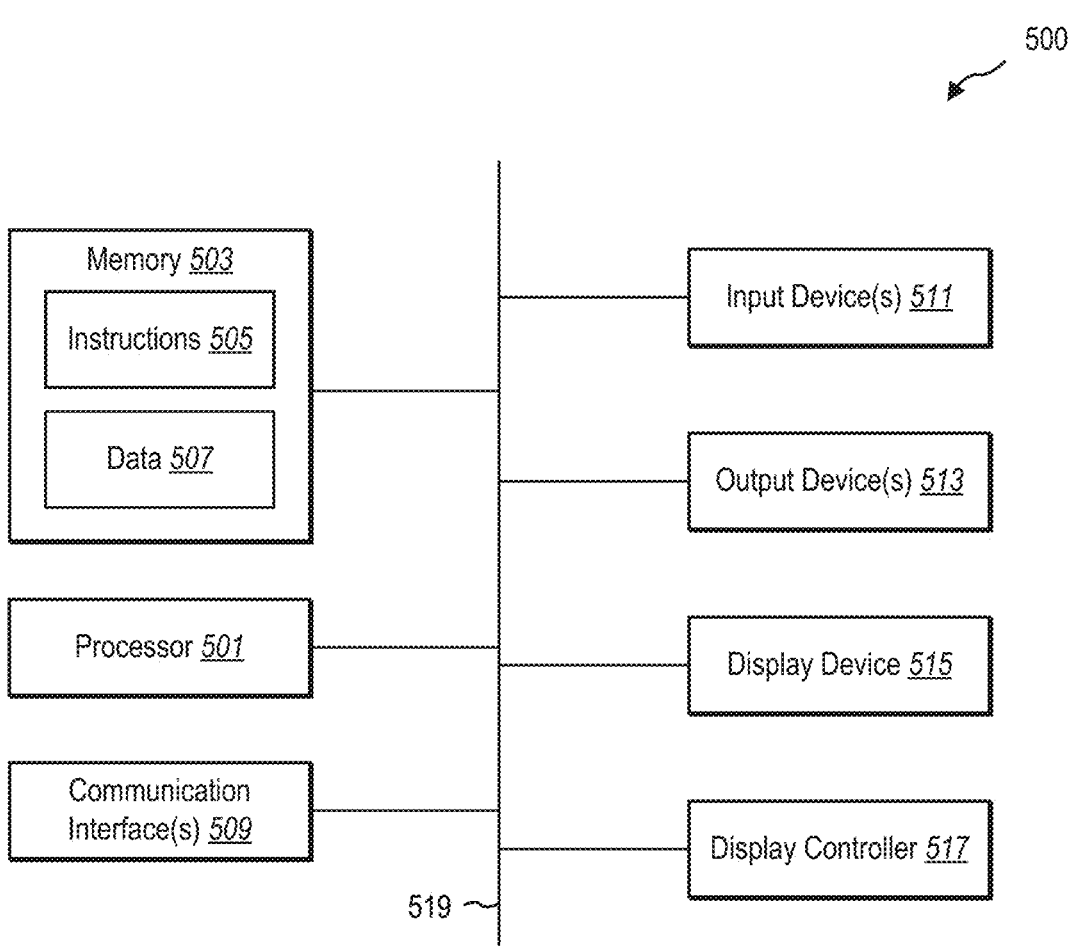
FIG. 5 illustrates components that may be included within a computer system.

FIG. 5 illustrates components that may be included within a computer system 500. One or more computer systems 500 may be used to implement the various methods, devices, components, and/or systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of models and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth© wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

In some implementations, the various components of the computer system 500 are implemented as one device. For example, the various components of the computer system 500 are implemented in a mobile phone or tablet. Another example includes the various components of the computer system 500 implemented in a personal computer.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as models, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   generating, using a large language model (LLM), an LLM output for an input that includes natural language;
   creating, by parsing text of the input and text of the LLM output, a feature vector with features that encode a readability of the text of the input and the text of the LLM output, wherein the features include human readability features that provide metrics to calculate a value that quantifies a human readability of the text of the input and the text of the LLM output and a complexity of text included in the input and the LLM output;
   generating, using the feature vector, a confidence score that estimates an accuracy of the LLM output based on a readability of the text of the input and the text of the LLM output;
   presenting the LLM output and the confidence score; and
   using the confidence score in evaluating the LLM output and detecting hallucinations in the LLM output.

2. The method of claim 1, wherein the human readability features include sentence length, word length, or syllable count.

3. The method of claim 1, wherein the features include language model evaluation features that evaluate a performance of the LLM.

4. The method of claim 3, wherein the language model evaluation features include perplexity of the text of the LLM output or log-likelihood of the text of the LLM output.

5. The method of claim 1, wherein the confidence score is based on the features that measure a complexity level of the text of the input or the text of the LLM output.

6. The method of claim 1, wherein a trained classifier model uses the feature vector to generate the confidence score.

7. The method of claim 6, wherein the classifier model is trained by:
   using a set of features extracted from input sentences from a dataset, the LLM output for the input sentences, and ground truth information for the input sentences to train the classifier model to set the confidence score to a value in a range between zero and one in response to comparing the LLM output to the ground truth information; and
   using the set of features extracted from the input sentences to train the classifier model in identifying which features impacted the confidence score.

8. The method of claim 1, further comprising:
   outputting insights for the confidence score, wherein the insights provide an explanation for the confidence score.

9. The method of claim 8, wherein the insights identify the features in the feature vector that impacted the confidence score, and the explanation includes the features.

10. A system, comprising:
   a processor;
   memory in electronic communication with the processor; and
   instructions stored in the memory, the instructions being executable by the processor to:
      generate, using a large language model (LLM), an LLM output for an input that includes natural language;
      create, by parsing text of the input and text of the LLM output, a feature vector with features that encode a readability of the text of the input and the text of the LLM output, wherein the features include human readability features that provide metrics to calculate a value that quantifies a human readability of the text of the input and the text of the LLM output and a complexity of text included in the input and the LLM output;
      generate, using the feature vector, a confidence score that estimates an accuracy of the LLM output based on a readability of the text of the input and the text of the LLM output;
      present the LLM output and the confidence score; and
      use the confidence score in evaluating the LLM output and detecting hallucinations in the LLM output.

11. The system of claim 10, wherein the human readability features include sentence length, word length, or syllable count.

12. The system of claim 10, wherein the features include language model evaluation features that evaluate a performance of the LLM.

13. The system of claim 12, wherein the language model evaluation features include perplexity of the text of the LLM output or log-likelihood of the text of the LLM output.

14. The system of claim 10, wherein the confidence score is based on the features that measure a complexity level of the text of the input or the text of the LLM output.

15. The system of claim 10, wherein a trained classifier model uses the feature vector to generate the confidence score.

16. The system of claim 15, wherein the instructions are further executable by the processor to train the classifier model by:
   using a set of features extracted from input sentences from a dataset, the LLM output for the input sentences, and ground truth information for the input sentences to train the classifier model to set the confidence score to a value in a range between zero and one in response to comparing the LLM output to the ground truth information; and
   using the set of features extracted from the input sentences to train the classifier model in identifying which features impacted the confidence score.

17. The system of claim 10, wherein the instructions are further executable by the processor to:
   output insights for the confidence score, wherein the insights provide an explanation for the confidence score.

18. The system of claim 17, wherein the insights identify the features in the feature vector that impacted the confidence score, and the explanation includes the features.

19. The method of claim 1, further comprising:
   determining a hallucination occurred in the LLM output based on the confidence score; and outputting insights that provide an explanation identifying what contributed to the hallucination performed by the LLM.

20. The method of claim 19, further comprising:

improving a performance of the LLM by updating the input to the LLM based on the insights.

\* \* \* \* \*